June 1, 1965   A. FRANKEL ET AL   3,186,742
FLEXIBLE JOINT FOR DUCT SYSTEM
Filed Feb. 16, 1961   5 Sheets-Sheet 1

INVENTORS
Adolf Frankel
Jerzy Andre Lorett
BY Fred L. Witherspoon, Jr.
Fred E. Shoemaker
ATTORNEYS

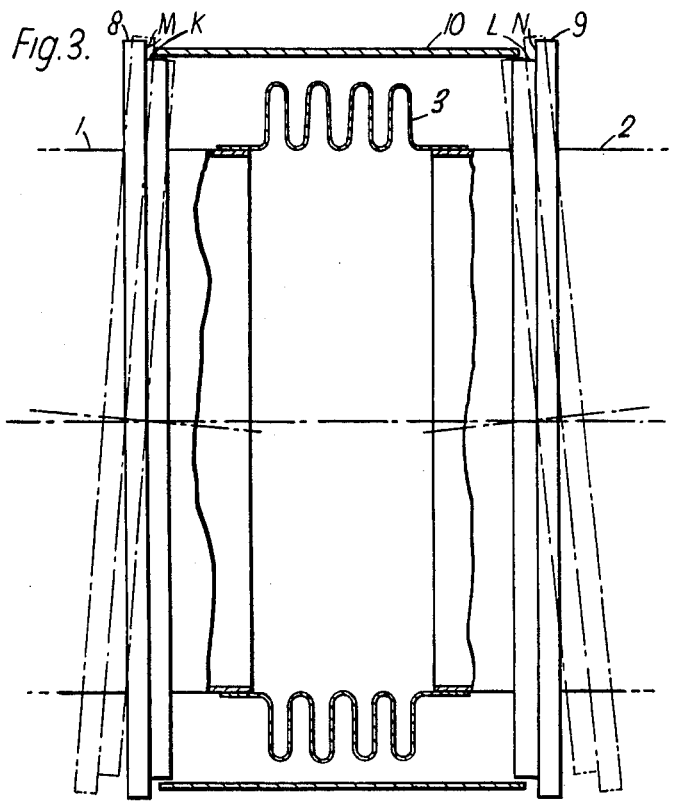
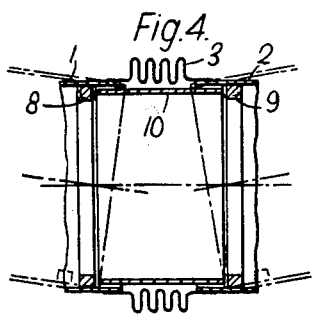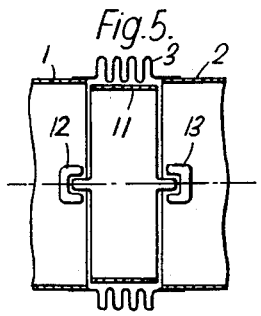

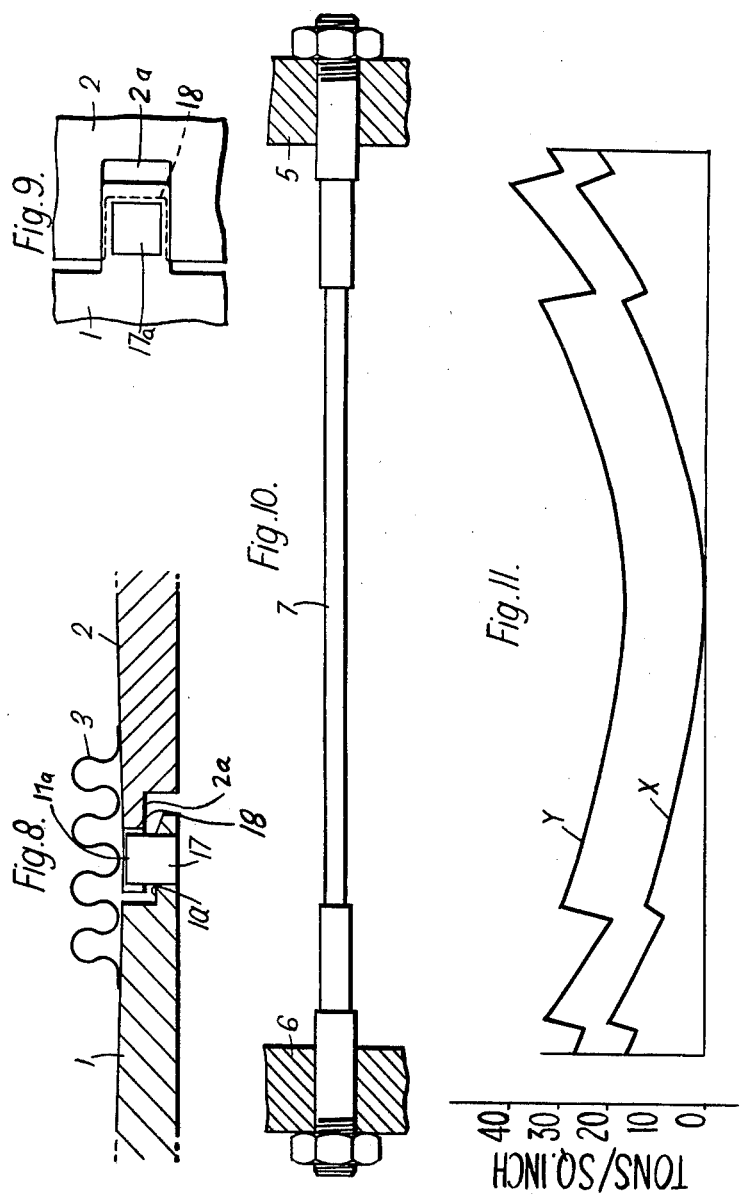

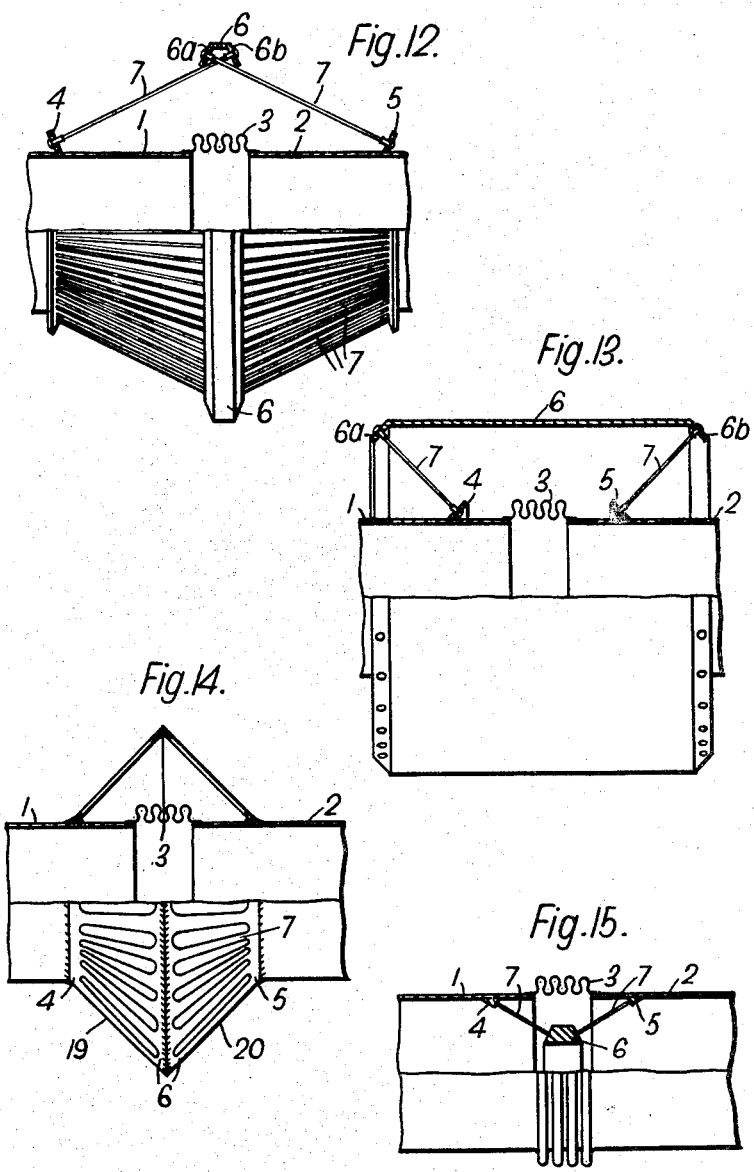

United States Patent Office 3,186,742
Patented June 1, 1965

3,186,742
FLEXIBLE JOINT FOR DUCT SYSTEM
Adolf Frankel, Newcastle-on-Tyne, and Jerzy A. Lorett, Ponteland, Northumberland, England, assignors to Richardsons, Westgarth & Co. Limited, Northumberland, England
Filed Feb. 16, 1961, Ser. No. 89,854
Claims priority, application Great Britain, Feb. 24, 1960, 6,555/60
13 Claims. (Cl. 285—114)

This invention relates to duct systems for conveying a gas or liquid under pressure or under partial vacuum which includes a flexible joint to provide for angular displacement between two ducts due, for example, to thermal expansion.

It is usual for the flexible joints in such systems to comprise flexible convolutions in the shape of a bellows. Each bellows is strong enough to withstand a force exerted upon it by the fluid in a direction perpendicular to its normal axis and is flexible enough to withstand an angular and/or axial displacement of low magnitude, but it is generally not at all capable of transmitting the considerable axial thrust which results from the pressure of fluid contained in the system, and it is therefore necessary to provide an axial restraint in the form of a so-called axial tie.

The design of the tie should be such as to permit more or less free angular displacement of the two ducts connected by the joint while at the same time providing a substantially rigid connection between them along their axes. Various solutions have been proposed, but they all have the disadvantage that they either do not provide for free angular displacement in all directions, and/or they include components which are movably joined to other components. For instance, universally movable joints are known which involve the transmission of the axial force through members movably connected by ball and socket or similar connections at each end to the duct and to a floating ring respectively. In such a joint the movable connections must operate under load and possibly under elevated or sub-zero temperatures and there is therefore a distinct danger of the movable connections seizing or fretting in service resulting in failure of the joint.

It is an aim of the present invention to overcome these disadvantages and to provide an axially rigid tie which eliminates the danger of movable components becoming seized.

According to the invention, a duct system for conveying a gas or liquid under pressure or under partial vacuum comprises a pair of ducts joined together by a flexible joint which includes a tie provided with an anchorage on each duct and a substantially rigid floating member suspended by means of elastic or resilient members extending from each of the anchorages and inclined with respect to its duct, in which the joints between the elastic members and the anchorages and between the elastic members and the floating member are substantially rigid, and in which the diameter of the pitch-circle of joints (as herein defined) on the floating member is different from the diameter of the pitch-circle of joints on the anchorages.

The expression "pitch-circle of joints" is used herein to define an actual or imaginary circle which passes through and links together the joints at the ends of the elastic members on the floating member or on either of the two anchorages, and includes loci which are not true circles. In addition, the word "joints" is used broadly to include points of transition in those cases where the elastic members are integral with the floating member and/or the anchorages.

It will therefore be seen that the angular displacement of the two ducts in a system according to the invention depends almost entirely on the flexibility of the elastic members. This renders it unnecessary to employ movable joints between them and the floating member and anchorages respectively, so that any risk of a breakdown as a result of one or more of the movable joints seizing is entirely eliminated.

In order that the invention may be understood more thoroughly, some examples in accordance with it will now be described with reference to the accompanying diagrammatic drawings, in which:

FIGURE 3 is a cross-sectional view on an enlarged scale of part of FIGURE 1;

FIGURE 4 is a cross-sectional view of an alternative arrangement to that shown in FIGURE 3;

FIGURE 5 is a cross-sectional view of a shunt for transmitting shear and/or torsional forces between the ducts so that they by-pass the bellows;

FIGURE 8 is a cross-sectional view through part of yet another shunt;

FIGURE 9 is a fragmentary plan view of the shunt shown in FIGURE 8;

FIGURE 10 is a cross-sectional view of an elastic member for use in the tie illustrated in FIGURE 1;

FIGURE 11 is a diagram with curves indicating the tensile and bending stresses to which the elastic member shown in FIGURE 10 is subjected in operation;

FIGURE 12 is a part-sectional view of another external tie according to this invention;

FIGURE 13 is a part-sectional view of yet another external tie according to this invention;

FIGURE 14 is a part-sectional view of an additional external tie according to this invention; and FIGURE 15 is a part-sectional side view of an internal tie according to the invention.

Figure 1:
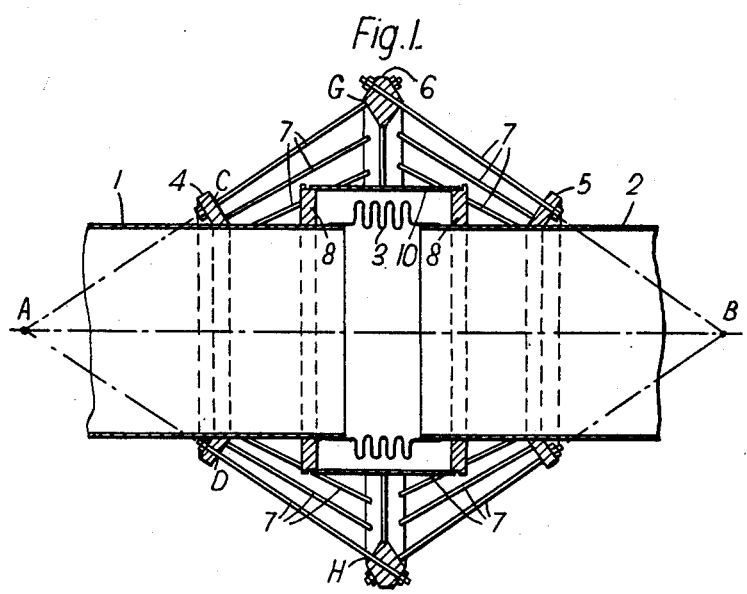
FIGURE 1 is a cross-sectional view of two ducts joined by a bellows and having an external tie of substantially double-frusto-conical shape.

FIGURE 1 shows two ducts 1 and 2 forming part of a duct system and being joined by a bellows 3. As is usual, the bellows is substantially flexible as regards axial and angular displacements. Anchorages in the form of annular flanges 4 and 5 project outwards from the ducts 1 and 2 respectively in planes lying transversely to the duct axes at equal distances from the respective duct ends. A rigid floating member 6 is floatingly suspended mid-way between the flanges by elastic members 7 which take the form of straight steel bars of uniform diameter and length, and which extend in equal numbers from each of the flanges. The floating member 6 shown in FIGURE 1 is a ring, but it may be shaped differently. Likewise, the diameter of each of the bars 7 may vary along the length of the bar. The bars are joined substantially rigidly by means of locking nuts to the floating member 6 and the duct flanges 4 and 5 respectively, and the pitch circle of joints on the ring 6 is substantially larger in diameter than the diameter of the pitch circles of joints on the duct flanges 4 and 5.

Instead of using steel bars 7, bars capable of elastic deformation and made of other high-tensile metal, for instance, a nickel or copper alloy, may be used. The bars are screw-threaded at their ends which project through clearance holes provided in the ring 6 and the flanges 4 and 5. The diameter of each clearance hole is such as to prevent substantially any lateral movement of the bar ends in their respective holes. As already indicated, they are fastened rigidly by means of nuts to the ring and the flanges respectively so that, in operation, each angle of the triangular configuration formed between the joints at the ring 6 and at the flanges 4 and 5 respectively remains substantially constant at the joints. The bars are thus deflected laterally in such a fashion that the curvature of each bar varies from a maximum positive value near one end of the bar to a maximum negative value near its other end and passes through a point of inflection near the mid-length of the bar—i.e. the bars take up the shape of an elongated letter S.

The bars 7 are distributed evenly around the periphery of their respective ducts and are arranged at an acute angle to the duct with each of them contained in a radial plane. If it is desired to reduce the angular rigidity of the tie, for instance, in a particular plane or particular planes, an uneven distribution of the bars may then be more advantageous. In either case, a tie according to the invention ensures that an axial thrust P in the duct system is transmitted through the elements 4, 5, 6 and 7 due to tensioning of the bars 7 instead of being transmitted from one duct to the other through the bellows 3. The transfer of the force away from the axis of the duct system into the axes of the bars 7 causes a tensile hoop stress in the flanges 4 and 5 and a compressive hoop stress in the ring 6. As a result of the even distribution of the bars around the periphery of the ducts, the force is transmitted through the duct system with a minimum of disturbance and stress concentrations.

The bars are relatively long in comparison with their diameter, and are therefore very considerably stiffer in tension than in bending. This characteristic of the bars determines the operation of the joint, and although the tie shown in FIGURE 1 allows angular displacement of the ducts 1 and 2 to take place in any plane, it will be assumed for ease of explanation that an angular displacement takes place in the vertical plane through the centre of the joint and all movements will be considered in relation to the ring 6. If, therefore, the ring 6 is taken as a fixed reference in space, it is evident from FIGURES 1 and 2 that, because of the axial stiffness of the bars 7, a point C on the flange 4 cannot move in any other direction except substantially about an arc generated from a point G on the ring 6. Likewise, a point D on the flange 4 can only move about an arc generated from a point H on the ring 6. These motions allow only an angular displacement of the duct 1 about an instantaneous centre located at a point A which is the point at which the axes of the bars 7 fixed to the flange 4 intersect. Likewise, the duct 2 can only be displaced angularly about a point B. As a result, the bellows 3 too is displaced from the centre line of the duct system and takes up the angular displacement. In spite of the angular displacement however the joint remains substantially rigid along the axes of the ducts.

Figure 2:
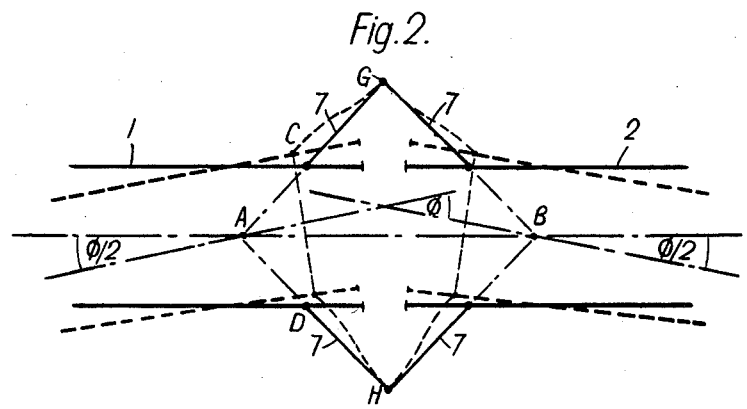
FIGURE 2 is a diagram illustrating the operation of the joint shown in FIGURE 1.

In order to make the geometry entirely clear, FIGURE 2 illustrates a simplified system in which the elastic bars 7 are shown as being fixed directly to the ducts 1 and 2 respectively, i.e. the duct anchorages and the flexible joint have been omitted for the sake of clarity. Assuming a total angular displacement equal to an angle $\phi$, each duct is then displaced by an angle of $\phi/2$ about the points A and B respectively. The broken lines show the joint after it has been subjected to this angular displacement, and it is to be noted that the axial loads on the floating member 6 and on the anchorages 4 and 5 at all times fully balance each other. The relatively small angular displacements which take place will not generally exceed ±5°—depending on the pressure of the fluid in the system.

In order to prevent the bellows from being overstrained, means may be provided to restrict the maximum permissible angular movement of the bellows and of the ducts. This is achieved in the joint illustrated in FIGURE 1, and as shown in more detail in FIGURE 3, by fixing auxiliary flanges 8 and 9 externally to the ducts 1 and 2 respectively. The flanges 8 and 9 are of stepped diameters, thus providing peripheral faces K and L and shoulders M and N respectively. A movable sleeve 10 is located on the faces K and L, its length being such as to allow clearance between its faces and the shoulders M and N respectively when the ducts 1 and 2 are in their normal positions. The amount of clearance is determined by the maximum angular deflection which is required, and when the ducts are angularly displaced, as indicated by the broken lines in FIGURE 3, the end faces of the sleeve 10 will touch the shoulders M and N and thus prevent further angular deflection.

For the sake of clarity, the bellows convolutions in both FIGURE 3 and FIGURE 4 are shown as being substantially stationary in space—unlike the joints shown in FIGURES 1 and 2. Instead of using auxiliary flanges of stepped diameter, flanges of uniform diameter may be fixed to the ducts 1 and 2 respectively. In this case, the sleeve 10 may be located on the ducts 1 and 2 so that the opposing end faces of the auxiliary flanges replace the shoulders M and B of the flanges 8 and 9 illustrated. The auxiliary flanges, instead of being fixed to the ducts 1 and 2 at some distance from the duct ends, may be arranged at these ends.

The deflection-limiting means illustrated in FIGURE 4 differ from the means shown in FIGURE 3 in that the flanges 8 and 9 project radially inwards from the ducts 1 and 2 respectively and that the sleeve 10 is located inside the bellows 3. The principle of operation is the same as in FIGURE 3.

A flexible joint, in addition to being subjected to thrust, may also be subjected to transverse forces resulting from torsional and/or shear loading against which protection must be given. Such protection can be obtained by providing a shunt which is arranged to transmit the said forces from one duct to the other so that the forces bypass the bellows. One form of shunt is illustrated in FIGURE 5 and comprises a sleeve 11 arranged inside the bellows 3 and provided at each of its end faces with a projection for engagement with a recess in each of a pair of blocks 12 and 13 fastened to the inside wall of the ducts 1 and 2 respectively. Thus, for example, if the duct 1 is subjected to a torsional force, this force, instead of being transmitted to the bellows 3, is prevented from affecting the bellows by the inter-action of the elements 11, 12 and 13. The end faces of the sleeve 11 may have a number of projections for engagement in recesses in a corresponding number of blocks in the ducts. Other modifications are possible; for example, the blocks in each duct may be replaced by a ring having a number of recesses, the blocks or rings may be provided with projections for engaging suitable recesses in the end faces of the sleeve 11; or the sleeve 11 may be replaced by one or more torsion-resistant members such as metal bars. Finally, the auxiliary flanges 8 and 9 and the sleeve 10 may be so designed and arranged that, in addition to their primary function of limiting the angular deflection of the ducts 1 and 2, they also prevent the bellows from being subjected to torsional and/or shear forces so that the provision of the separate elements 11, 12 and 13 is rendered unnecessary.

In another form of shunt, transverse forces are transmitted from one duct to the other through duct arms connected by resilient rods each of which is located in a plane lying transversely to the duct axes. Two alternative shunts of this construction are illustrated in FIGURES 6 and 7.

Figure 6:
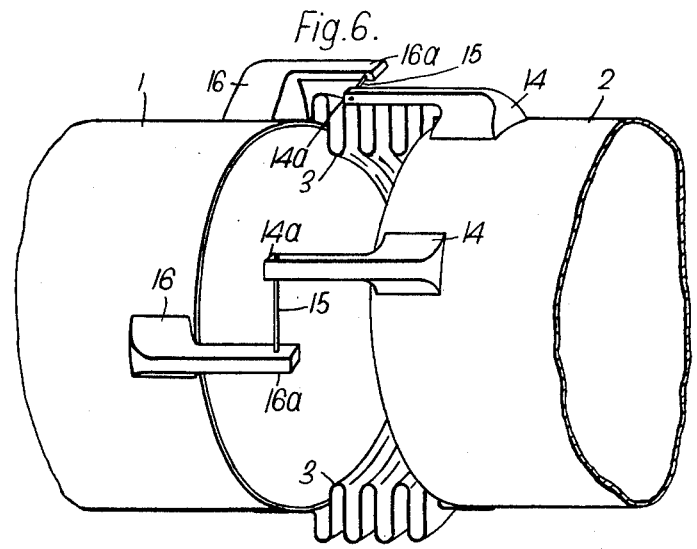
FIGURE 6 is a partly perspective and partly cross-sectional view of another form of shunt.

Turning first to the arrangement shown in FIGURE 6, it will be seen that each of the ducts 1 and 2 is provided with a number of arms 14 and 16 respectively, one end of each arm being fastened to its respective duct while its other free end 14a and 16a respectively projects in the direction of the other duct, that is to say all the ends 14a project towards the duct 1 and all the ends 16a project towards the duct 2. The arms are grouped into pairs, each pair consisting of one arm 14 and one arm 16, the free ends 14a and 16a of each pair being connected by a resilient rod 15. The pairs of arms 14, 16 are arranged substantially symmetrically about the duct axes and, although it is not essential, their length is preferably such that their ends 14a and 16a at least reach the mid-distance between the ducts 1 and 2 so that each of the rods 15 is contained in a plane lying transversely to the duct axes and located half-way between the duct ends.

Figure 7:
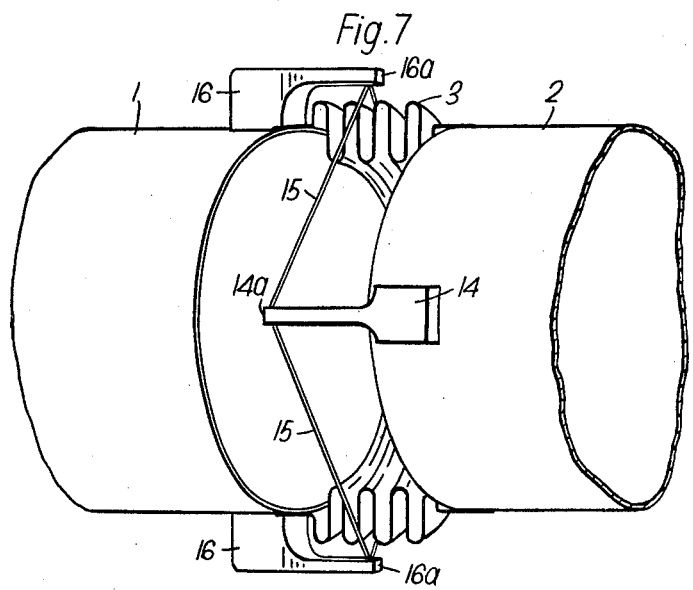
FIGURE 7 is a partly perspective and partly cross-sectional view of yet another form of shunt.

The shunt illustrated in FIGURE 7 differs from the arrangement shown in FIGURE 6 in that it has a reduced number of oppositely-directed arms 14 and 16. A further difference is that, instead of each end 14a being connected by one of the rods 15 to one end 16a, two rods 15 extend from each end 14a and 16a respectively to the two peripherally closest ends 16a and 14a respectively so that a circumferentially-continuous shunt is produced.

The arms 14 and 16 and the rods 15 in the constructions illustrated in FIGURES 6 and 7 are located outside the bellows 3. This is not essential; it is possible to arrange both types of the shunt inside the bellows and the ducts 1 and 2 respectively.

FIGURES 8 and 9 illustrate a particularly simple form of shunt. In this instance the two ducts 1 and 2 are extended axially so as to overlap each other and thus form a spigot-like joint having abutting circumferential faces or lips 1a and 2a. The spigot-like joint is produced by reducing the wall thickness of the ducts over a predetermined distance from their respective end faces in such a fashion that, in the case of the one duct the external diameter is reduced, while in the case of the other duct the internal diameter is increased. Other methods of producing a joint of this type, for instance by flaring the end of one of the ducts, may be employed. At least one of the abutting faces is curved in order not to impede the relative angular movement of the ducts, and the inner face 1a is provided with at least one dowel or key 17 the head 17a of which engages a slot 18 in the outer face 2a. The dimensions of the dowel head 17a in relation to the slot 18 are such as to provide clearance between them. The extent of the clearance is sufficient to allow the desired angular movement of the ducts but is small enough to restrict the torsional load on the bellows.

A shunt of this construction can also have the lips 1a and 2a so designed that the shunt serves to limit angular deflection of the ducts in addition to transmitting transverse forces between the ducts 1 and 2.

Various modifications of the tie illustrated in FIGURE 1 are possible. For example, the elastic members 7, instead of being of uniform diameter, may diminish in diameter from both ends towards their mid-lengths. Such a reduction in diameter may be in the form of oppositely-directed steps or in the form of a steady diametrical reduction. In the latter case, the contour of each bar may show four straight lines converging in pairs from the bar ends towards the mid-length of the bar, or two oppositely-directed curves which are closest to one another at the mid-length of the bar and diverge towards the bar ends.

The elastic member 7 illustrated in FIGURE 10 is a bar of a Cr-Mo-steel conforming to British standard En. 19 for use in a joint of the construction illustrated in FIGURE 1. The overall length of the bar is 36" and its diameter is reduced in two steps from a maximum of 0.840" at each of its ends to 0.600" at its mid-length, the diameter of the second step being 0.740". The curves X and Y shown in FIGURE 11 indicate the tensile and bending stresses to which the bar 7 is subjected in operation, the curve Y representing the combined tensile and bending stress, and the curve X representing the bending stress alone.

It is evident from FIGURE 11—as previously indicated—that when the bar 7 is in its deflected position, there is a point of inflection near its mid-length at which the bending stress is zero. Particular characteristics of a joint of the type illustrated in FIGURE 1 which is provided with bars of the kind illustrated in FIGURES 10 and 11 are given in section I of the table of typical examples immediately preceding the claims.

As stated in connection with FIGURE 1, the floating member 6 need not be a ring. Examples of a different form of floating member, i.e. a short tube or cylinder, are shown in FIGURES 12 and 13. In these two figures each end face of the tube 6 is provided with a flange 6a and 6b respectively and, in the arrangement shown in FIGURE 12, the elastic members 7 extending from the duct flange 4 are joined to the tube flange 6b, and the elastic members extending from the duct flange 5 are joined to the tube flange 6a so that the bars cross each other inside the tube. This arrangement renders it possible to reduce the space required for accommodating the tie. Such a reduction could, in theory, also be achieved simply by shortening the length of the elastic members 7, but this expedient may be detrimental to the flexibility of the tie. Instead of fastening the members 7 to the flanges 6a and 6b respectively, they may still cross each other inside the tube by lengthening the tube and then fastening them directly thereto thus achieving a staving of space in at least one direction. Particular characteristics of a tie of the construction illustrated in this embodiment are set forth in section IV of the table of typical examples.

The tie illustrated in FIGURE 13 is adapted for use with ducts conveying a gas under partial vacuum. It differs in detail from the ties illustrated in FIGURES 1 and 12 by a very much longer cylindrical floating member 6 which exceeds in length the distance between the flanges 4 and 5 so that the axes of all the elastic members 7 intersect at a single point inside the bellows 3. One advantage of this arrangement is that a shear restraint may be dispensed with since all the elastic members rotate about the same instantaneous centre. However, a torque restraint may still be required. Particular characteristics of a tie of this construction are set out in section V of the above-mentioned table of typical examples.

The elastic members, instead of being individually and detachably secured to the floating member and to the anchorage, may be strips produced by cutting a number of evenly-distributed longitudinal slots around the peripheries of two conical mantles extending in opposite directions from each of the ducts. Such an arrangement is illustrated in FIGURE 14, in which two conical mantles 19 and 20 are welded directly to the ducts 1 and 2 respectively with their larger ends in confronting relation. Likewise, the abutting end faces of the two mantles are welded together so that the unslotted ends of the mantles constitute the floating member and the duct anchorages respectively. However, the use of the conical mantles is not restricted to this particular arrangement. Anchorages in the form of flanges or collars may be provided on each of the ducts 1 and 2 and the mantles may be joined to an independent floating ring or tube. Further, the slots on at least one side of each mantle may extend to the respective end face so that one end of each of the resultant strips may be fastened directly to the floating member, or the duct anchorage as the case may be, instead of being fastened thereto by its root in the mantle. The word "cutting" as used in this connection is not restricted to its narrow meaning of cutting away, for instance by machining or by use of a welding torch, but should be understood to include any convenient method of manufacture, for instance forging, by which the desired configuration can be produced. Like the bars 7, the cross-sectional area of the strips at their mid-length may be smaller than at their ends. This may be achieved by shaping the slots cut into the mantles, by varying the thickness of the mantles, or by using a combination of both methods.

Particular characteristics of a tie of this construction are set out in section VI of the above-mentioned table of typical examples.

The arrangements illustrated in FIGURES 1, 12, 13 and 14 include ties of substantially double-frusto-conical cross-sections surrounding the flexible joint 3. The two opposing cones in FIGURES 1, 12 and 14 have a common base in the form of the floating member 6 while their tops are formed by the anchorages 4 and 5 respectively. This arrangement is reversed in the embodiment illustrated in FIGURE 13. A similar reversal of the geometric configuration will be found in the embodiment illustrated in FIGURE 15 in which a tie according to the invention is arranged inside the bellows 3. The floating member 6 shown in the figure is again a ring, which may be replaced by a short tube. Alternatively, a substantially solid body may be used as the floating member, in which case the pitch-circle diameter of joints on the solid body may be reduced to such an extent that the axes of the elastic members intersect at the core of the body. Particular characteristics of a tie of this construction are set out in section VII of the table of typical examples.

Further, the bars 7, instead of being fixed to the ring 6 and the flanges 4 and 5 respectively with their axes located in planes containing the axes of the ducts 1 and 2 so as to form a tie of opposing conical frusta, may be arranged at an angle to the duct axes in such a fashion that the tie conforms substantially to two oppositely-directed hyperboloids, of which they are the generatrices. Finally, although the use of a bellows as the flexible joint will be most advantageous arrangement in most instances, other flexible joints may be used. Sections II and III of the appended table relate to two embodiments of a tie in accordance with the invention which, although they are not specifically described, are substantially similar to the arrangement illustrated in FIGURE 1.

*Table of typical examples*

| Joint No. | Gas Pressure, p.s.i. | Gas Temperature, °C. | Angular Deflection Between Two Ducts, degrees | Number of Elastic Members Per Side | Maximum Lateral Deflection of Elastic Members, inches |
|---|---|---|---|---|---|
| I | 264 | 400 | ±1 | 120 | 0.314 |
| II | 50 | 250 | ±3.25 | 200 | 0.296 |
| III | 250 | 600 | ±.8 | 60 | 0.077 |
| IV | 185 | 320 | ±1 | 96 | 0.069 |
| V | 14 Hg Vacuum | −50 | ±1 | 24 | 0.061 |
| VI | 200 | 320 | ±1½ | 200 | 0.118 |
| VII | 100 | 220 | ±.3 | 40 | 0.0157 |

What we claim as new and desire to secure by Letters Patent of the United States is:

1. In a duct system for conveying a gas or liquid under pressure or partial vacuum, a flexible connection permitting angular displacement between a first duct and a second duct, and means joining said ducts in fluid tight relation and wherein the flexible connection comprises substantially the sole force transmitting means between said ducts and includes a tie, said tie comprising a first plurality of circumferentially equi-angularly spaced flexible bars, means rigidly securing the flexible bars to the first duct adjacent its end so that all forces from the duct are transmitted axially through the said flexible bars, a second plurality of circumferentially spaced flexible bars, means rigidly securing the second plurality of flexible bars to the second duct adjacent its end so that all forces from the second duct are transmitted axially through the second plurality of flexible bars, said flexible bars on each duct being of equal length and inclined at the same angle with respect to their duct, said first plurality of bars being oppositely inclined to said second plurality of bars, a rigid floating annular member centrally supported with respect to the aligned axes of the ducts by said first and second plurality of flexible bars, means rigidly securing the flexible bars to the floating member whereby all forces are transmitted axially through the bars so that any displacement between the axes of the two ducts will cause each flexible bar to bow inwardly and outwardly, said floating member retaining its original configuration throughout the entire range of operating pressures.

2. The duct system as described in claim 1 and wherein the flexible bars are rigidly fixed to each respective duct by an annular flange secured thereto, said flexible bars being rigidly fixed to the annular flanges.

3. The invention as described in claim 1 and wherein said bars are individually and detachably fixed to the floating member and its duct.

4. A duct system as described in claim 1 and wherein the floating member is a hollow cylinder having the flexible members fixedly secured to it adjacent the end face of the cylinder closest to the respective duct anchorage.

5. A duct system as described in claim 1 and wherein the floating member is a hollow cylinder having the flexible members fixedly secured to it adjacent the end face of the cylinder which lies remote from the respective duct anchorage.

6. The invention as set forth in claim 1 and including means to limit the angular deflection of the flexible joint.

7. A duct system according to claim 6 in which the deflection-limiting means comprise an auxiliary duct flange fixed adjacent the end of each duct, and a sleeve positioned between the end faces of the auxiliary flanges, the arrangement being such that the angular deflection of the ducts is limited as a result of the sleeve ends fouling the said end faces.

8. A duct system according to claim 7 in which the auxiliary duct flanges project radially inward from their respective ducts, and the sleeve is located substantially inside the joint.

9. A duct system according to claim 7 in which the auxiliary duct flanges project radially outward from their respective ducts and the joint is located substantially inside the sleeve.

10. A duct system according to claim 1 and including a shunt arranged to transmit transverse forces exerted upon one of the ducts to the other duct.

11. A duct system according to claim 10 and wherein the shunt includes a torsion-resistant member positioned between the two ducts and cooperating engagement means on each duct and on each end of the torsion-resistant member for transmitting torsional forces from one duct to the other.

12. The duct system as described in claim 10 wherein the shunt comprises a plurality of arms secured to and projecting axially from each duct toward the other duct, said arms being grouped into pairs of oppositely-extending arms, said pairs being arranged symmetrically about the duct axes, and a resilient rod connecting the free ends of each pair of arms.

13. A duct system as described in claim 10 and wherein the shunt comprises a plurality of arms secured to and projecting axially from each duct toward the other duct, said arms being arranged substantially symmetrically about the duct axes, and a resilient rod connected between the free ends of adjacent arms to form a continuous formation transverse to the duct axes.

References Cited by the Examiner
UNITED STATES PATENTS

| | | | |
|---|---|---|---|
| 2,406,234 | 8/46 | Marancik | 285—227 |
| 2,713,503 | 7/55 | Ekholm | 285—226 |
| 2,930,116 | 3/60 | Minges | 285—227 |
| 2,969,247 | 1/61 | Eggmann | 285—114 |
| 3,072,422 | 1/63 | Armstrong | 285—416 |

CARL W. TOMLIN, *Primary Examiner.*
HUNTER C. BOURNE, Jr., *Examiner.*